(12) United States Patent
Chatterjee et al.

(10) Patent No.: US 8,849,694 B1
(45) Date of Patent: Sep. 30, 2014

(54) PREDICTING PROMOTIONAL MESSAGE RESPONSE BASED ON DEVICE DISTANCE

(75) Inventors: Surojit Chatterjee, Fremont, CA (US); Terry Van Belle, Santa Clara, CA (US); Anshul Kothari, Sunnyvale, CA (US); Jian Zhou, Milpitas, CA (US); Paul Feng, Palo Alto, CA (US); Ravi Jain, Palo Alto, CA (US); Nandita Narasimha Prabhu, Mountain View, CA (US); Yun Huang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 652 days.

(21) Appl. No.: 12/851,833

(22) Filed: Aug. 6, 2010

(51) Int. Cl.
*G06Q 30/00* (2012.01)
*G06Q 90/00* (2006.01)

(52) U.S. Cl.
CPC ..................................... *G06Q 90/00* (2013.01)
USPC ........................................................ 705/14.1

(58) Field of Classification Search
CPC ..................................................... G06Q 90/00
USPC ............................................................ 705/14.1
See application file for complete search history.

(56) References Cited

U.S. PATENT DOCUMENTS

2008/0248815 A1* 10/2008 Busch ........................ 455/456.5

* cited by examiner

*Primary Examiner* — Daniel Lastra
(74) *Attorney, Agent, or Firm* — Fish & Richardson P.C.

(57) ABSTRACT

Various methods, systems, and computer program products are disclosed for communicating location-based promotional messages to a mobile communication device. The method may include receiving a request associated with a mobile communication device. In response to the request, the method may include determining a location of the mobile communication device and a potential interest of a user of the mobile communication device. Based on the location of the mobile communication device and the potential interest of the user, the method may include identifying a promotional message from among other promotional messages. Upon identification, the method may include communicating the promotional message to be displayed at the mobile communication device.

32 Claims, 10 Drawing Sheets

PREDICTING PROMOTIONAL MESSAGE RESPONSE BASED ON DEVICE DISTANCE

FIELD OF THE INVENTION

The disclosure relates to generating promotional messages communicated to mobile communication devices and in particular to identifying promotional messages to be communicated to mobile communication devices based on a combination of location and interest of a user.

BACKGROUND OF THE INVENTION

An increasing number of services use location-based information to determine content provided to mobile communication devices. For example, using location-based information, a service provider or other entity may indicate points of interest within close proximity to (i.e., within a particular distance of) the mobile communication device. In this manner, a user of the mobile communication device may determine nearby points of interest such as restaurants, shopping centers, or other points of interest.

Some conventional systems use location-based information to identify promotional messages to be delivered to mobile communication devices. However, these systems typically are one-dimensional in that location without interest-based information is used to identify the promotional messages. Thus, conventional location-based systems fail to incorporate interest-based information when identifying promotional messages that are communicated to the mobile communication device. In this manner, a promotional message may impose a feeling of "spam" to the user. For example, a vegetarian may not be interested in a promotional message such as an advertisement for a steak-house merely because the vegetarian is nearby the steak-house.

Conventional systems also fail to analyze and/or provide metrics on the effects of distance on a promotional campaign. The distance between a mobile communication device and a physical location of an entity such as a brick-and-mortar store of a retailer may affect success rates of a promotional campaign. For example, a promotional message communicated to a mobile communication device may be more effective when the mobile communication device is closer to a physical location than when the device is farther from the physical location. Likewise, different types of promotional messages may be more effective than other types of promotional messages when the mobile communication device is closer to a physical location than when the device is farther from the physical location.

Conventional systems fail to provide these and other metrics that allow discovery of effects of distance on promotional messages. Thus, advertisers and other entities may be unable to determine effectiveness of various promotional campaigns based on a combination of user interests and distance from a physical location.

What is needed is a method that takes both location of a mobile communication device and interests of a user into account to provide location-based promotional messages. What is further needed is a method that provides metrics on the effects of distance on promotional messages so that promotional content may be identified based on a combination of user interests and distance from physical locations of an entity. These and other problems exist.

SUMMARY OF THE INVENTION

Various systems, computer program products, and methods for communicating location-based promotional messages and reporting effectiveness of location-based promotional messages delivered to mobile communication devices are described herein.

According to various implementations of the invention, the method may include receiving a request associated with a mobile communication device. In response to the request, the method may include determining a location of the mobile communication device and at least one potential interest of a user of the mobile communication device. Based on the location and the at least one potential interest of the user, the method may include identifying a promotional message from among a plurality of promotional messages. The method may include communicating the promotional message to be displayed at the mobile communication device.

According to various implementations of the invention, the method may include receiving a request associated with a mobile communication device. In response to the request, the method may include determining a location of the mobile communication device and at least one potential interest of a user of the mobile communication device. Based on the location of the mobile communication device and the at least one potential interest, the method may include determining a plurality of predictions each corresponding to one of a plurality of promotional messages. Each prediction may indicate a probability that a corresponding promotional message will be selected by a user of the mobile communication device. Based on the plurality of predictions, the method may include identifying a promotional message from among the plurality of promotional messages. The method may include communicating the promotional message to be displayed at the mobile communication device.

According to various implementations of the invention, a method of reporting effectiveness of location-based promotional messages delivered to mobile communication devices is described. The method may include receiving distance information that indicates a distance between a mobile communication device and a physical location of an entity and receiving virtual information that indicates a virtual access by the mobile communication device to a virtual location of the entity. The method may include generating an association between the distance and the virtual access and determining, based on the association, a distance between the physical location when the mobile communication device accessed the virtual location. The method may include generating a report that includes at least a portion of the distance information and at least a portion of the virtual information based on the determined distance from the physical location.

DETAILED DESCRIPTION OF THE INVENTION

Figure 1:
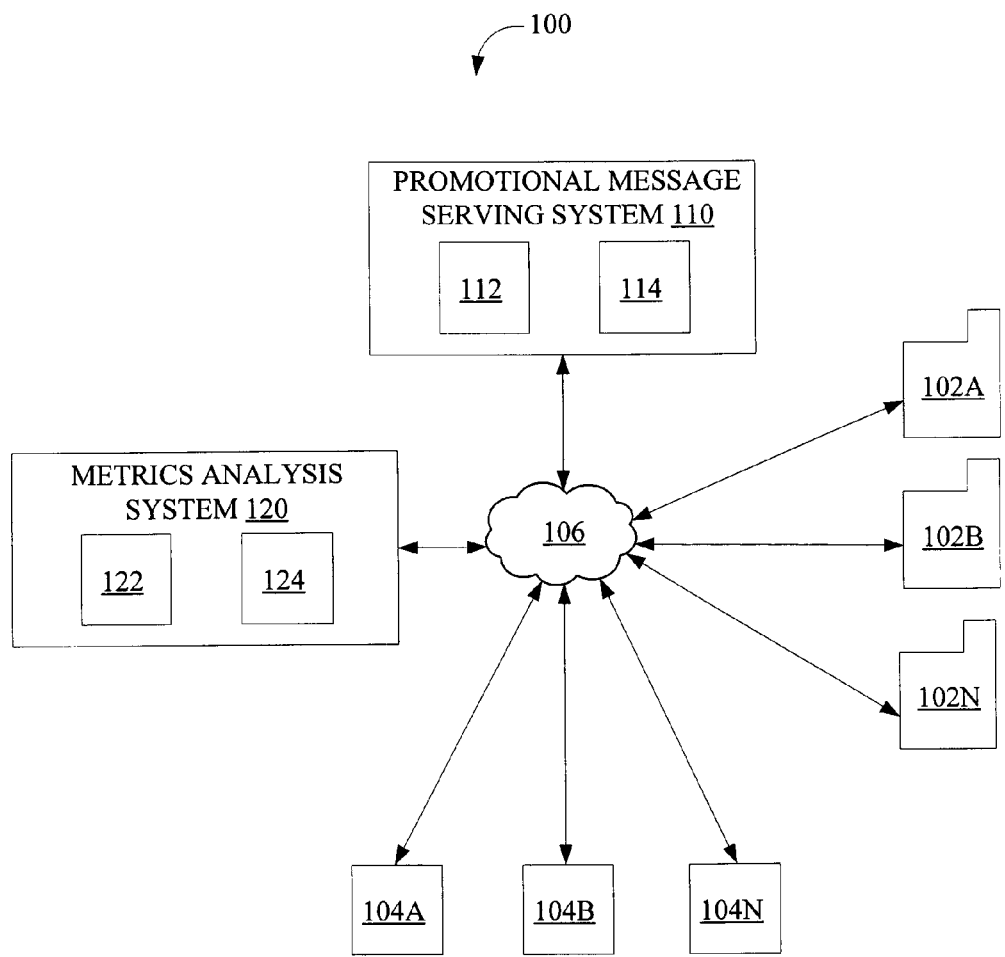
FIG. 1 is a block diagram illustrating a system of communicating location-based promotional messages to mobile communication devices, according to various implementations of the invention.

FIG. 1 is a block diagram illustrating a system 100 of communicating location-based promotional messages to mobile communication devices, according to various implementations of the invention. Promotional messages may include, but is not limited to, advertisements, coupons, restaurant menus, directions, and/or other promotional content. According to various implementations of the invention, system 100 may include, but is not limited to, a promotional message serving system 110, a metrics analysis system 120, a mobile communication device 102 (illustrated in FIG. 1 as a plurality of mobile devices 102A, 102B, 102N), and a client device 104 (illustrated in FIG. 1 as client devices 104A, 104B, 104N).

In some implementations of the invention, promotional message serving system 110, metrics analysis system 120, mobile communication device 102, and client device 104 may be coupled to one another via a network 106. Network 106 may include a Local Area Network, a Wide Area Network, a cellular communications network, a Public Switched Telephone Network, and/or other network or combination of networks.

In some implementations of the invention, promotional message serving system 110 may receive a request associated with mobile communication device 102. In some implementations of the invention the request includes a request for a promotional message to be delivered to mobile communication device 102. In some implementations of the invention, the request is associated with a "pull" request where mobile communication device 102 requests information. In other words, the request may include or otherwise originate from the pull request such that results from the pull request can include the promotional content. For example, the pull request may include, but is not limited to, keyword search terms for conducting an online search, a request for promotional messages from an application executing on mobile communication device 102, and/or other request for information originating from mobile communication device 102. In a non-limiting example, a user of mobile communication device 102 may be near a shopping district and enter a keyword search term "jeans" in order to find retailers that sell jeans. In another example, the pull request may be associated with a location-based application executing on mobile communication device 102. The location-based application when executed by mobile communication device 102 may, for example, find nearby points of interest. The request may include or originate from the pull request (such as the search request or the location-based application request) to cause one or more promotional messages to be displayed with the results of the pull request.

In some implementations of the invention, the request is associated with a "push" request where information is communicated to mobile communication device 102 based on predefined settings. In a non-limiting example, the push request may include a subscription to one or more promotional messages of an entity such as a clothing retailer. The subscription may, for example, include pushing to mobile communication device 102 promotional messages that: indicate sales events, include coupons, include video, include images, or otherwise convey promotional messages.

In some implementations of the invention, in response to the request, promotional message serving system 110 may determine a location of mobile communication device 102 and at least one potential interest of a user of mobile communication device 102. In some implementations of the invention, the location is determined based on location-based information. In some implementations of the invention, the at least one potential interest of the user is determined based on interest-based information.

In some implementations of the invention, the location may be directly determined based on the location-based information. For example, the location-based information may include, but is not limited to, latitude and longitude coordinates. In some implementations of the invention, the location may be determined based on an approximation based on the location-based information. For example, the location-based information may include, but is not limited to, an identifier that identifies a cellular tower in communication with mobile communication device 102. The range and/or location of the cellular tower may be known so that an approximate location of mobile communication device 102 may be determined.

In some implementations of the invention, the location-based information may include, but is not limited to, Global Positioning System (GPS) information, Wireless Local Area Network information such as WiFi information, cellular tower information, an Internet Protocol (IP) address, prior keyword search information (which may suggest a location), map application information (such as a geographic map or directions displayed at mobile communication device 102), and/or other information from which the location may be determined.

In some implementations of the invention, the location may be determined based on a hierarchical ranking of location-based information based on reliability, accuracy, precision, and/or other performance metric. For example, a first location-based information may be more reliable, accurate, precise, or otherwise more effective for determining the location than a second location-based information. When the first location-based information is not available, the second location-based information may be used. A third location-based information may be used when the second location-based information is not available, and so-on. In some implementations of the invention, when the user of mobile communication device 102 grants permission to communicate the location-based information, the granted location-based information may be hierarchically higher than (i.e., preferentially used over) other location-based information.

In some implementations of the invention, interest-based information may include actions or other behavior of the user of mobile communication device 102 that potentially indicates content that is interesting to the user. In other words, actions or behavior of the user may indicate interests of the user. In some implementations of the invention, interest-based information may include, but is not limited to, one or more keywords of a search, prior selections of promotional messages (i.e., promotional messages and/or types, such as coupons, advertisements, etc., of promotional messages that the user has previously selected), a history of web pages visited by the user, demographics of the user (such as age, gender, and/or other demographics), history of prior geographic locations of the user, prior saves of related promotional messages for future viewing, and/or other information that may indicate one or more interests of the user.

For instance, based on search terms that include planetary names or star names, promotional message serving system 110 may determine that the user is potentially interested in astronomy. Based on a history of user selections of promotional messages that advertise shoe specials, for example, promotional message serving system 110 may determine that the user is potentially interested in shoes (or more generally, that the user is interested in shopping). Based on a history of user web page visits to sports scores, for example, promotional message serving system 110 may determine that the user is potentially interested in sports. Thus, based on interest-based information, potential interests of the user may be determined.

As used herein, "selecting" or "selection of" promotional messages includes, but is not limited to, clicking with a finger, a stylus, or other object; shaking or tapping mobile communication device 102; uttering a verbal command; and/or taking any other action in relation to mobile communication device 102 to indicate a selection of a promotional message.

In some implementations of the invention, the interest-based information may be stored at mobile communication device 102 (and subsequently communicated to promotional message serving system 110), at promotional message serving system 110, and/or other location accessible by promotional message serving system 110 to identify an appropriate promotional message. In some implementations of the invention, as would be appreciated, promotional message serving system 110 and/or mobile communication device 102 may store or otherwise have access to a user profile that identifies the user and includes the interest-based information of the user.

In some implementations of the invention, promotional message serving system 110 may identify, based on the location of mobile communication device 102 and the at least one potential interest of the user, a promotional message from among a plurality of promotional messages. In some implementations of the invention, the plurality of promotional messages is included within a queue of promotional messages that are to be communicated via a promotional or advertising network. Because the promotional message is identified based on a combination of the location of the user (as determined from the location of mobile communication device 102) and a potential interest of the user, the identified promotional message may have a likelihood of being selected by the user that is greater than a promotional message identified based on only one of the location or the interest of the user.

In some implementations of the invention, a user may, for example, enter a search key word "shopping" using mobile communication device 102. Based on a determined location of mobile communication device 102 and a determined interest of the user (such as an interest in shoes), promotional message serving system 110 may identify a particular promotional message that indicates a special on shoes from a shoe store that is within close proximity to (i.e., a specified distance from) the user. In this manner, both the interest of the user and the location of the user is used to identify the particular promotional message. In contrast, conventional systems may communicate a promotional message for fishing gear merely because a fishing goods store is nearby even though the user has not indicated interest in such gear. In these conventional systems, the promotional message may have a feeling of "spam" to the user.

In some implementations of the invention, promotional message serving system 110 may communicate the promotional message to be displayed at mobile communication device 102. In some implementations of the invention, promotional message serving system 110 may communicate the identified promotional message to a third party that subsequently communicates the promotional message to mobile communication device 102. In some implementations of the invention, promotional message serving system 110 may communicate the identified promotional message to mobile communication device 102.

In some implementations of the invention, promotional message serving system 110 may generate, based on the location and the at least one potential interest, a plurality of predictions each corresponding to one of a plurality of promotional messages. Each prediction may indicate a probability that a corresponding promotional message will be selected by a user of mobile communication device 102. Thus, in some implementations, the location of mobile device 102 and the interest of the user may affect the probability that a promotional message will be selected. For example, a first promotional message having a higher probability of being selected than a second promotional message may be identified to be delivered or communicated to mobile communication device 102 instead of the second promotional message. In these implementations, promotional message serving system 110 may identify a promotional message based on the predictions. In other words, promotional message serving system 110 may identify promotional messages that are more likely to be selected by the user than other promotional messages based on the location and user interests.

In some implementations of the invention, promotional message serving system 110 may determine, based on the location of mobile communication device 102, a distance between mobile communication device 102 and a physical location of an entity associated with the promotional message. In these implementations, a prediction corresponding to the promotional message may be based on the distance and the interests of the user. For example, at least some of the plurality of promotional messages (such as the messages in the queue of promotional messages) may be associated with or otherwise originate from an entity such as a retailer that operates a physical location such as a retail store. In some implementations of the invention, promotional message serving system 110 may determine a distance between mobile communication device 102 and the physical location of the entity. In these implementations, the probability that the user will select a particular promotional message may increase as the user gets closer to the physical location of the entity. As such, promotional message serving system 110 may use the distance between mobile communication device 102 and the physical location of the entity when determining the prediction corresponding to the promotional message from the entity.

For example, a first promotional message may be associated with or otherwise originate from a first entity having a physical location that has a first distance from the user (i.e., a mobile communications device 102). A second promotional message may be associated with or otherwise originate from a second entity having a physical location that has a second distance from the user that is greater than the first distance. A third promotional message may be associated with or otherwise originate from a third entity such as an Internet-only retailer that has no physical locations. In the foregoing examples, assuming the promotional messages are associated with the same level of interest from the consumer, promotional message serving system 110 may determine a higher probability of being selected by the user for the first promotional message than the second promotional message and a higher probability of being selected by the user for the second promotional message than the third promotional message. As would be appreciated, the prediction may be based on a balancing of distance/location and interest-based factors.

In some implementations of the invention, each of the plurality of promotional messages may be associated with a bid. The bid may include a value or other indication that indicates a dollar or other currency amount that an originator, such as an advertiser, of a promotional message is willing to pay to have the promotional message displayed in the advertising network to which promotional message serving system 110 has access. For example, promotional message serving system 110 may receive or otherwise obtain the bid. In these implementations, promotional message serving system 110 may determine an expected revenue return value based on the bid value and the prediction corresponding to the promotional message and may identify a promotional message based on the expected revenue return value. In other words, promotional message serving system 110 may identify promotional messages in a manner that is expected to maximize fees from entities such as advertisers that wish to promote their goods and/or services via promotional messages.

In some implementations of the invention, the expected revenue return value is given by the equation:

$$E = p \times b \quad (1).$$

In equation (1): E is the expected revenue return value (obtained by the product of p and b); p is the probability that the promotional message will be selected by the user; and b is the bid. Thus, in some implementations, the expected revenue return value may be based on a combination of the prediction/probability of being selected (which itself may be based on the location and the interest of the user) and the bid. In these implementations, the bid may be sufficiently high to overcome a prediction with a low probability and vice versa.

In some implementations of the invention, p is a function of various input predictive factors, x, as given by the equation:

$$p = f(x) \quad (2),$$

In equation (2), x may include, for example, distance from physical location, interest-based information, historical performance of promotional messages (such as whether a promotional message was selected by the user), and/or other predictive factors described below. Based on one or more of the predictive factors, a probability that a promotional message will be selected by the user may be generated.

In some implementations of the invention, the bid is changed as a function of the distance, d, as given by the equation:

$$b = g(d) \quad (3).$$

In other words, promotional message serving system 110 may associate different bids of a promotional message for different distances. For example, an entity such as an advertiser may be willing to pay more for a promotional message delivered to the user via mobile communication device 102 when the user is at a closer distance from a physical location than a farther distance. The entity may submit—and promotional message serving system 110 may receive—different bids for different distances.

In some implementations of the invention, content of the promotional message is changed as a function of the distance. In other words, promotional message serving system 110 may cause different content of the promotional message to be communicated to mobile communication device 102 based on the distance between mobile communication device 102 and a physical location of an entity associated with the promotional message. In this manner, an entity such as an advertiser may choose to display different content based on different distances from a physical location of the entity. The content may include, but is not limited to, walking directions to the physical location, an input to make reservations, an input to search product availability, one or more images associated with the physical location, one or more promotional offers, a restaurant menu, a business update, a phone number call-to-action, an ad check-in, one or more upcoming events, and/or other promotional content. For example, when mobile communication device 102 is at a first distance from the physical location, promotional message serving system 110 may cause coupons to be delivered to mobile communication device 102. When mobile communication device 102 is at a second distance closer than the first distance, promotional message serving system 110 may cause directions to be delivered to mobile communication device 102. As would be appreciated, different permutations of different content at different distances may be used. The different permutations may be specified by the entity and/or be determined by promotional message serving system 110.

In some implementations of the invention, the distance is associated with accuracy information that indicates an accuracy of the distance. In these implementations, the prediction corresponding to the promotional message may be based on the accuracy information. For example, promotional message serving system 110 may increase or decrease the probability that the user will be interested in a promotional message based on the accuracy of the location-based information used to determine the location of mobile communication device 102.

In some implementations of the invention, promotional message serving system 110 may determine a weight factor for at least one of the distance and the interest-based information. In these implementations, the plurality of predictions is based on the determined weight factor. The weight factor may increase or decrease a weight given to the distance and/or interest-based information when generating a prediction of the probability that a user will be interested in a promotional message. In some implementations of the invention, the weight factor is used to emphasize more important or otherwise more predictive factors. For example, the location of mobile communication device 102 may be more heavily weighted than a history of web page visits. In this non-limiting example, promotional message serving system 110 may generate a prediction that relies more on the location of mobile communication device 102 than the history of web page visits. In this manner, different (location and interest) variables may be weighted differently so that the corresponding effect of each variable on the overall predication may be controlled.

In some implementations of the invention, promotional message serving system 110 may receive an indication that the promotional message was selected at mobile communication device 102 and may generate a plurality of subsequent predictions based on the indication. In other words, one or more user actions associated with mobile communication device 102 may be collected for subsequent analysis and predictions. Thus, the predictions generated by promotional message serving system 110 may change over time based on interest-based information.

In some implementations of the invention, the predictions are based on logistic regression analysis. For example, a prediction that a particular promotional message will be selected by the user may be generated. The prediction may be based on a variety of predictive factors such as different types of user-based interest described herein, distance from physical locations, and/or other factors used to predict whether the particular promotional message will be selected. One or more predictive factors may be assessed according to a click-through rate or other indication that the user selected the particular promotional message.

In some implementations of the invention, future predictions generated by promotional message serving system 110 may be based on a weighting of the predictive factors relative to one another based on whether the particular promotional message was selected by the user. In this manner, more important predictive factors (i.e., better predictors) may be weighted more heavily than less important predictive factors. Thus, more important predictive factors may affect the prediction outcome to a greater degree than less important predictive factors. For example, if smaller distances between a user (measured via mobile communication device 102) and a physical location is correlated with higher click-through rates than larger distances, then distance information may be weighted accordingly so that it is a relatively important predictive factor. If a history of prior promotional message selections by the user is a weak predictor of future selections by the user, then the history of the particular user may be assigned a lower weight. By fine-tuning the weights of these and other predictive factors, predictions that adapt to observed behavior may be achieved.

In some implementations of the invention, weighting of the predictive factors may be fine-tuned in this manner until an acceptable level of accuracy (such as a particular click-through rate) is achieved or otherwise until fine-tuning is no longer necessary. In some implementations, the predictive factors may be fine-tuned indefinitely as data becomes available.

According to various implementations of the invention, promotional message serving system 110 may include a processor 112, a memory 114, and/or other components that facilitate the functions of promotional message serving system 110 described herein. In some implementations of the invention, processor 112 includes one or more processors configured to perform various functions of promotional message serving system 110. In some implementations of the invention, memory 114 includes one or more tangible (i.e., non-transitory) computer readable media. Memory 114 may include one or more instructions that when executed by processor 112 configures processor 112 to perform the functions of promotional message serving system 110.

In some implementations of the invention, metrics analysis system 120 may generate one or more reports that illustrate effectiveness of location-based promotional messages delivered to mobile communication devices 102. A promotional message may be "effective" or otherwise successful based on whether the promotional message increases virtual accesses (such as web page visits) to a virtual location such as a web page, enhances virtual access duration, enhances click-through-rates (CTRs), and/or otherwise causes increased sales or increased exposure of goods/services. The one or more reports may be accessed using client device 104.

In some implementations of the invention, metrics analysis system 120 may receive distance information and virtual information. The distance information may indicate a distance between mobile communication device 102 and a physical location of an entity such as a retailer. The virtual information may indicate a virtual access by mobile communication device 102 to a virtual location of the entity. The virtual location may include online content such as a web page or other electronic content of the entity that can be accessed by mobile communication device 102. The virtual access may include an access, such as a web page visit, by mobile communication device 102 to the virtual location.

In some implementations of the invention, metrics analysis system 120 may generate an association between the distance and the virtual access. In other words, metrics analysis system 120 may associate a location of mobile communication device 102 with the virtual access that occurred. In this manner, based on the association, metrics analysis system 120 may determine a distance from the physical location of the entity when mobile communication device 102 accessed the virtual location of the entity.

In some implementations of the invention, metrics analysis system 120 may generate a report that includes an indication of the distance information and at least a portion of the virtual information based on the determined distance from the physical location. The indication of the distance information may include a range of distances (such as, for example, "less 100 meters from the physical location"), the actual distance from the physical location (such as "50 meters from the physical location"), and/or other indication that conveys the determined distance. In this manner, metrics analysis system 120 may achieve reporting capabilities that allow an entity to determine the effect of distance on success of promotional messages delivered to mobile communication devices 102. For example, metrics analysis system 120 may be used to determine whether promotional messages communicated to mobile communication devices 102 are more effective when communicated at closer distances, measured via the determined distance from the physical location, than farther distances. In other words, metrics analysis system 120 may provide metrics to determine whether promotional messages are more effective at increasing virtual accesses to a virtual location when mobile communication devices 102 are closer to a physical location than farther from the physical location.

In some implementations of the invention, the distance information includes a plurality of distances each corresponding to different distances between different mobile communication devices and the physical location. The different distances may include ranges of distances so that multiple data points may be included in the report. In other words, metrics analysis system 120 may generate different distance bins such, but not limited to, "<100 meters from physical location"; "100-500 meters from physical location"; "500 meters-1 kilometer from physical location"; and/or other distance bins. For each distance bin, metrics analysis system 120 may include a number of virtual accesses and/or other metrics of effectiveness of promotional messages. In this manner, the effect of different distances on effectiveness of promotional messages may be included.

In some implementations of the invention, metrics analysis system 120 includes revenue information based on the different distances. The revenue information may include a total revenue derived from or otherwise attributable to location-based promotional messages delivered to communication devices 102. In some implementations, the revenue information may include fees, paid by entities such as advertisers, for presenting the location-based promotional messages. In some implementations, the revenue information may include click-through rates, conversion rates, and/or other information that indicates revenue generated by entities such as advertisers as a result of the location-based promotional message being displayed.

In some implementations of the invention, the revenue information includes a revenue value associated with one or more of the plurality of distances. In these implementations, metrics analysis system 120 may display the revenue value with the associated one or more of the plurality of distances. In this manner, the effect of different distances on revenue may be analyzed or otherwise determined.

In some implementations of the invention, the virtual information may include, but is not limited to, a number of virtual accesses to the virtual location, a click-thru-rate, a number of pages visited during the virtual access, a bounce rate, a percent of new visits, and an average duration of the virtual access. By including these and other virtual information, metrics analysis system 120 may generate reports that display various metrics of effectiveness of promotional messages.

According to various implementations of the invention, metrics analysis system 120 may include a processor 122, a memory 124, and/or other components that facilitate the functions of metrics analysis system 120 described herein. In some implementations of the invention, processor 122 includes one or more processors configured to perform various functions of metrics analysis system 120. In some implementations of the invention, memory 124 includes one or more tangible (i.e., non-transitory) computer readable media. Memory 124 may include one or more instructions that when executed by processor 122 configures processor 122 to perform the functions of metrics analysis system 120.

Mobile communication device 102 may include a mobile device such as a cellular telephone, a personal digital assistant, a tablet computing device, and/or other mobile communication device on which promotional messages can be displayed. However, as would be appreciated, instead of or in addition to mobile communication device 102, various functions described herein may be applied to other devices such as a desktop computer or other computing devices that are not necessarily portable but can be located using one or more location-based information described herein. Client device 104 may include devices that can access reports and/or virtual locations described herein. For example, client device 104 may include a mobile communication device as described herein, a desktop computer and/or other computing devices.

Figure 2:
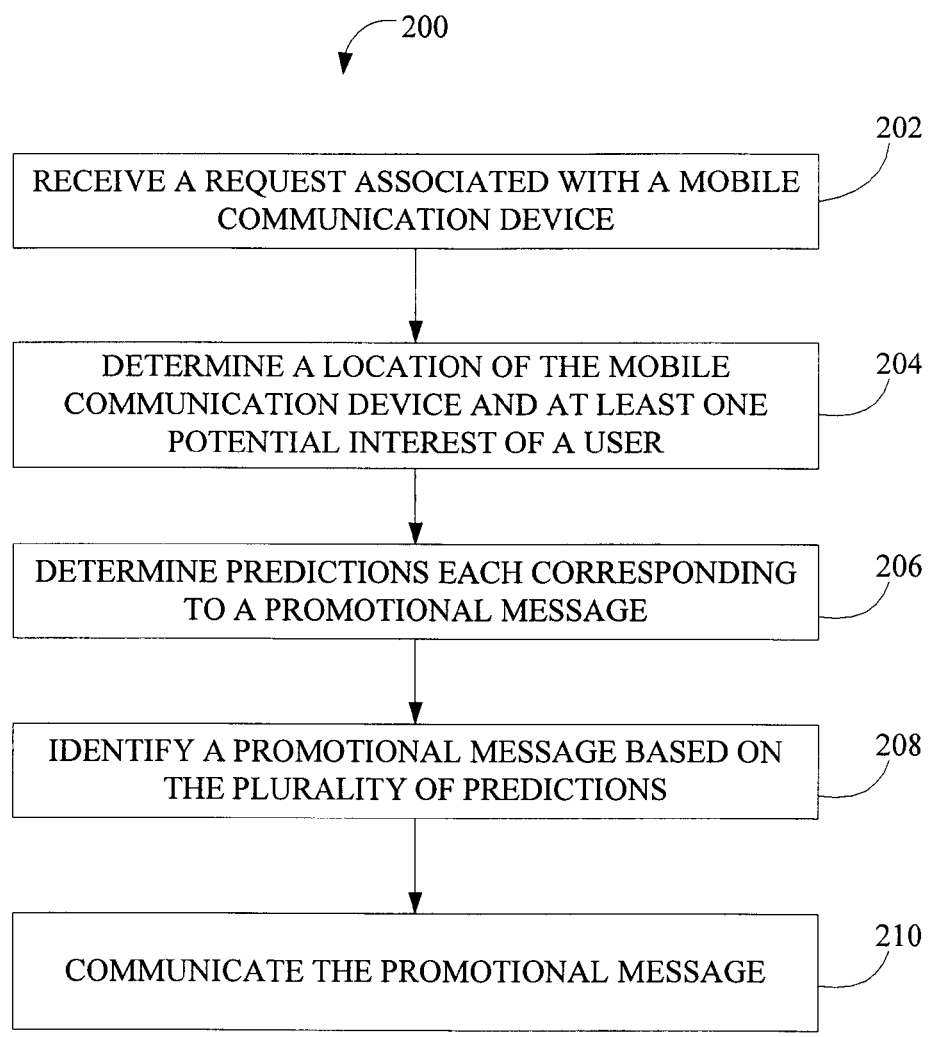
FIG. 2 is a flow diagram illustrating an example process of communicating location-based promotional messages to mobile communication devices, according to various implementations of the invention.

FIG. 2 is a flow diagram illustrating an example process 200 of communicating location-based promotional messages to mobile communication devices, according to various implementations of the invention. The various processing operations and/or data flows depicted in FIG. 2 (and in the other drawing figures) are described in greater detail herein. The described operations for a flow diagram may be accomplished using some or all of the system components described in detail above and, in some implementations of the invention, various operations may be performed in different sequences. According to various implementations of the invention, additional operations may be performed along with some or all of the operations shown in the depicted flow diagrams. In yet other implementations, one or more operations may be performed simultaneously. Accordingly, the operations as illustrated (and described in greater detail below) are examples by nature and, as such, should not be viewed as limiting.

In an operation 202, process 200 may receive a request associated with a mobile communication device (such as mobile communication device 102). The request may include a request for a promotional message. For example, a user of the mobile communication device may input one or more search keywords to execute a search. The search may include an Internet search, a search of the hard-drive of the device, or other search. The search may cause an application executing on the mobile communication device to request a promotional message.

For instance, an Internet browser submitting a search to a web search engine may cause the request for the promotional message. In another example, the user of the mobile communication device may interact with an application such as a gaming application, location-based service application, or other application executing on the mobile communication device. The interaction, such as a logon, initialization, or other action associated with the application may cause the application to request the promotional message. In other words, in some implementation of the invention, the request associated with the mobile communication device may include a request for a promotional message that originates from a search request, an application executing on the mobile communication device, or other information associated with the mobile communication device.

In an operation 204, in response to the request, process 200 may determine a location of the mobile communication device and at least one potential interest of a user of the mobile communication device. In some implementations of the invention, the location may be determined based on location information communicated from the mobile communication device for the purpose of locating the device (such as geographic coordinates communicated by the device when the user has granted location-based information to be communicated). In some implementations of the invention, the location may be determined based on location-based information associated with the mobile communication device but not necessarily communicated for the purpose of locating the device. Such location-based information may include, for example, an IP address of the mobile communication device and/or IP address of a carrier of the mobile communication device.

In some implementations of the invention, the potential interest of the user may include a determination of what may interest a user based on interest-based information such as, for example, search histories, web browsing histories, promotional messages that were selected by the user, and/or other information that may indicate an interest of the user. In some implementations of the invention, the potential interest may be based on subject-matter with varying degrees of specificity. For example, the potential interest may be general, such as a general interest in sports; specific, such as a specific interest in golf equipment; and/or fine-grained, such as an interest in a particular brand of golf equipment. In this example, the user may access a number of sports-related web pages over a period of time. More specifically, the user may access a number of golf-related web pages and visit a particular golf equipment provider's website. This history of web page visits may indicate that the user is potentially interested in sports, more particularly interested in golf, and even more particularly interested in a particular golf equipment manufacturer.

In some implementations of the invention, the user may access these virtual locations using the mobile communication device. The history of these accesses may be stored at the mobile communication device or at a location remote from the device. In some implementations of the invention, the user may access these virtual locations using a remote device, such as client device 104, remote from the mobile communication device. In these implementations, the user may be associated with the mobile communication device (via a user profile, a user identifier, or other association) so that process 200 may correlate the potential interests of the user with the location of the mobile communication device. In other words, a user's web browsing history (using the mobile communication device and/or other device) may be combined with the location of the user's mobile communication device to identify promotional messages to be communicated to the user's mobile communication device.

In some implementations of the invention, the potential interest may based on types (i.e., content) of promotional messages. For example, the user may be more interested in coupons than general sale announcements and/or the user may be more interested in walking directions than telephone call links. In this manner, process 200 may determine both the location of the user and potential interests (at various levels of specificity and types) of the user.

In an operation 206, process 200 may determine, based on the location of the mobile communication device and the at least one potential interest, predictions each corresponding to a promotional message. Each prediction may indicate a probability that a corresponding promotional message will be selected by a user of the mobile communication device. In other words, using both the location of the user (as measured by the location of the mobile communication device) and the interest of the user, process 200 may identify a likelihood that a promotional message will be selected by the user. In the foregoing example, a promotional message from a sporting goods retailer may be more likely to be selected by the user than a promotional message from a bakery. Also in the foregoing example, a promotional message from a sporting goods retailer that has a store nearby the user may be more likely to be selected by the user than a sporting goods retailer that has a store that is far from the user.

In an operation 208, process 200 may identify a promotional message from among the plurality of promotional messages based on the plurality of predictions. In other words, based on the probability or likelihood of being selected by the user, process 200 may identify one or more promotional messages. For example, process 200 may identify a promotional message associated with the sporting goods retailer that has a store nearby the user. In an operation 210, process 200 may communicate the promotional message to be displayed at the mobile communication device.

Figure 3:
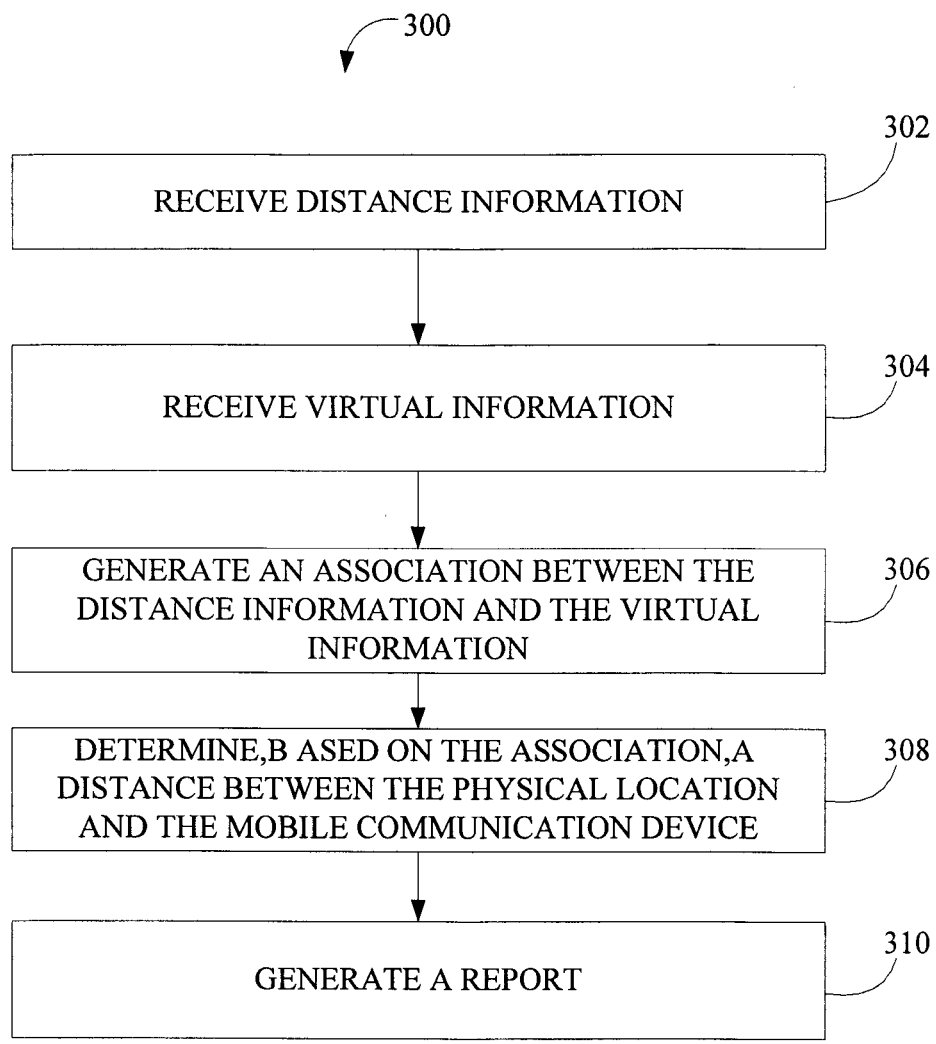
FIG. 3 is a flow diagram illustrating an example process of reporting effectiveness of location-based promotional messages delivered to mobile communication devices, according to various implementations of the invention.

FIG. 3 is a flow diagram illustrating an example process 300 of reporting effectiveness of location-based promotional messages delivered to mobile communication devices, according to various implementations of the invention. In an operation 302, process 300 may receive distance information that indicates a distance between a mobile communication device (such as mobile communication device 102) and a physical location of an entity. For example, a user of the mobile communication device may be within a distance such as 500 meters of a physical location such as a store of an entity such as a retailer. Process 300 may receive distance information (such as a location of the mobile communication and/or location of the physical location).

In an operation 304, process 300 may receive virtual information that indicates a virtual access by the mobile communication device to a virtual location of the entity. For example, a user of the mobile communication device may select a location-based promotional message and/or visit a web page of the entity. The virtual information may indicate the selection and/or the visit. In this manner, process 300 may receive information that the user via the mobile communication device has selected or otherwise accessed information related to the entity associated with the location-based promotional message.

In an operation 306, process 300 may generate an association between the distance information and the virtual information. In other words, process 300 may determine a correlation between the location of the mobile communication device and the virtual access. As would be appreciated, process 300 may perform operations 302, 304, and 306 in one or more operations. For example, process 300 may receive an association of the distance and the virtual access in a single operation (or in multiple operations as described).

In an operation 308, process 300 may determine, based on the association, a distance between the physical location and the mobile communication device when the mobile communication device accessed the virtual location. In other words, process 300 may determine the distance between the mobile communication device and the physical location of the entity when the device made the virtual access to the virtual location of the entity.

In an operation 310, process 300 may generate a report that includes at least a portion of the distance information and at least a portion of the virtual information based on the determined distance from the physical location. In other words, process 300 may provide metrics that includes the location of the mobile communication device and information related to the virtual access so that a viewer of the report may determine the effect of distance on promotional messages communicated to the mobile communication device.

Figure 4:
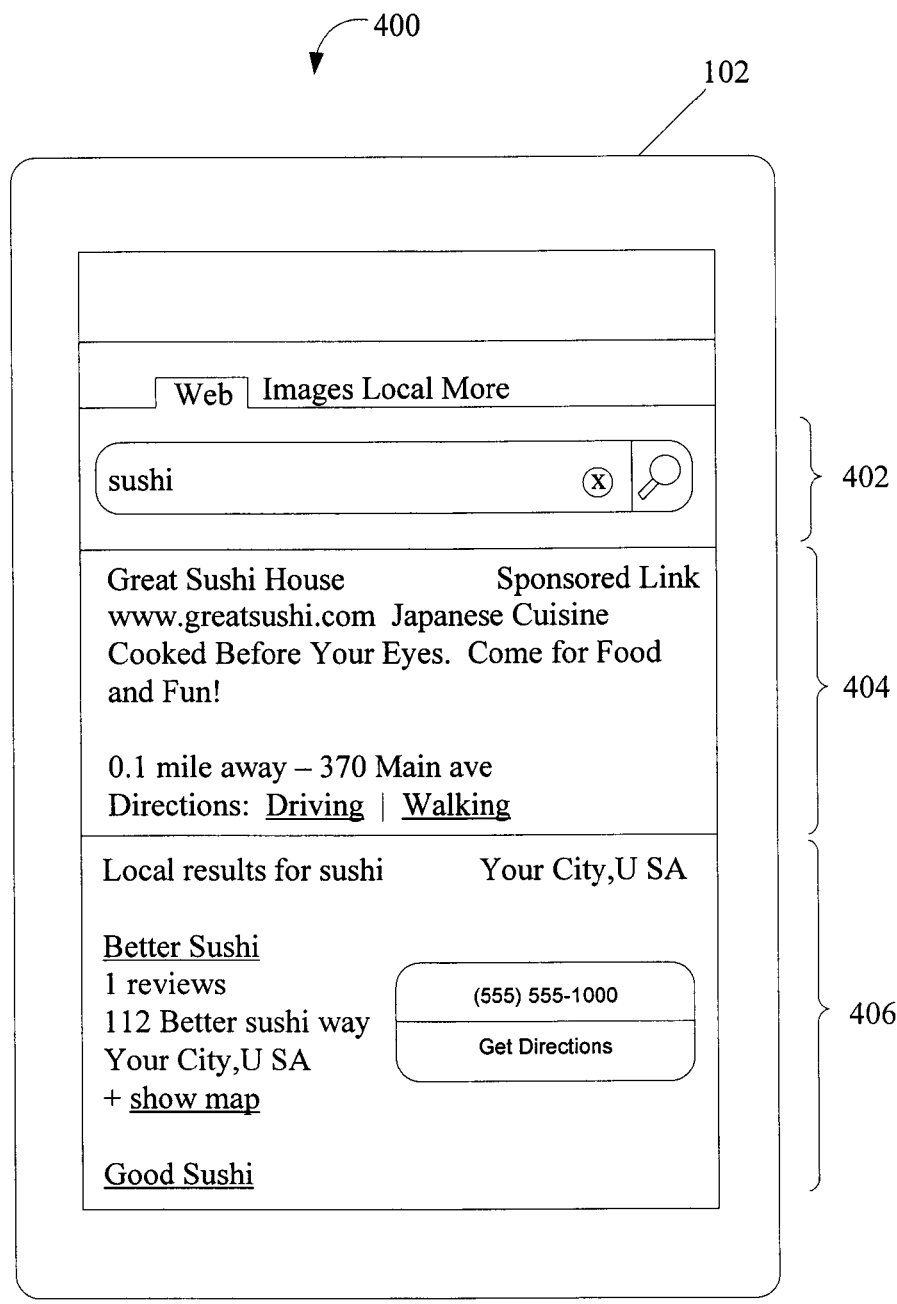
FIG. 4 is a diagram illustrating a location-based promotional message with directions displayed at a mobile communication device, according to various implementations of the invention.

FIG. 4 is a diagram 400 illustrating a location-based promotional message 404 with directions displayed at mobile communication device 102, according to various implementations of the invention. FIG. 4 and other drawing figures illustrating examples of displays are for illustrative purposes only. The examples of displays may include or exclude some graphical elements illustrated while adding other graphical elements not otherwise illustrated in the figures as would be appreciated.

In some implementations of the invention, mobile communication device 102 may display a search application such as an Internet browser or dedicated search application. The search application may provide a search input area 402 where one or more search keywords (illustrated in FIG. 4 as "sushi") may be entered. Along with search results 406, the search application may display promotional message 404. In some implementations of the invention, promotional message 404 may indicate a distance (illustrated in FIG. 4 as "0.1 mile away") from a physical location ("illustrated in FIG. 4 as the address "370 Main ave") of an entity (illustrated in FIG. 4 as "Great Sushi House") associated with promotional message 404. In some implementations of the invention, selection of the distance may cause mobile communication device 102 to display a map of the physical location.

As a result of the search request, the search engine (not otherwise illustrated in FIG. 4) may have made a request, associated with mobile communication device 102, for a promotional message. In response to the request for a promotional message, promotional message serving system 110 may have identified promotional message 404 from among other promotional messages based on the location of mobile communication device 102 and a potential interest of the user of mobile communication device 102. In other words, in some implementations of the invention, promotional message serving system 110 may not have identified promotional message 404 if mobile communication device 102 was not sufficiently close to the physical location of the entity. As previously noted, such potential interest may be determined based on interest-based information such as web search history, browsing history, history of selections of promotional messages (such as prior ad clicks), history of prior geographic locations of the user, and/or other interest-based information.

In some implementations of the invention, promotional message 404 includes directions to the physical location. The directions may include walking directions, driving directions, and/or other directions. In some implementations of the invention, a user selection of the directions may cause mobile communication device 102 to display a map, route, and/or text directions to the physical location. In some implementations of the invention, the map, route, and/or text directions are included as part of promotional message 404 (i.e., content of promotional message 404 may include the map, route, and/or text directions). In some implementations of the invention, the map, route, and/or text directions may be provided by mobile communication device 102 or other remote device (rather than being included with promotional message 404).

Figure 5:
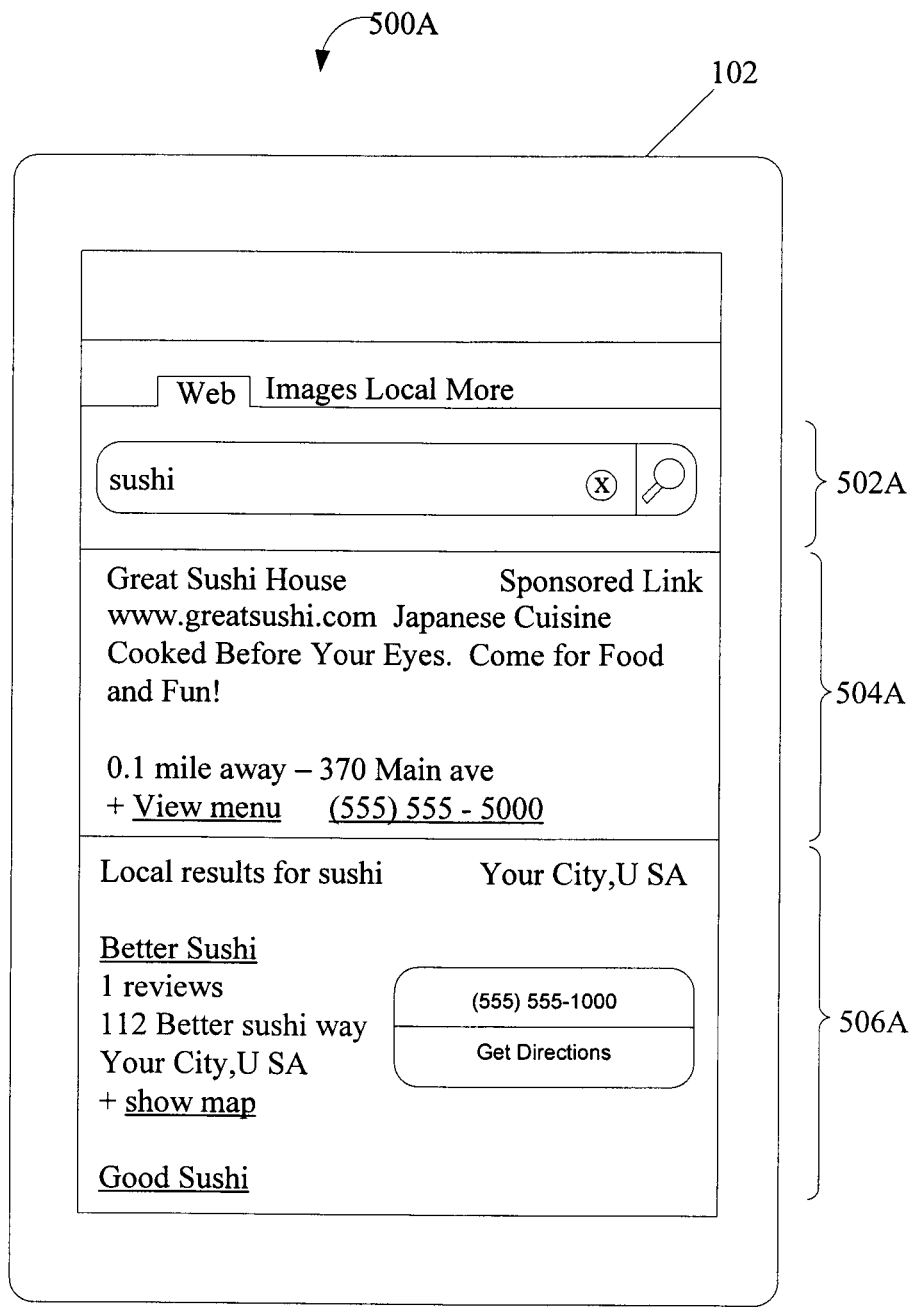
FIGS. 5A and 5B are diagrams illustrating a location-based promotional message with expandable content displayed at a mobile communication device, according to various implementations of the invention.
Figure 5:
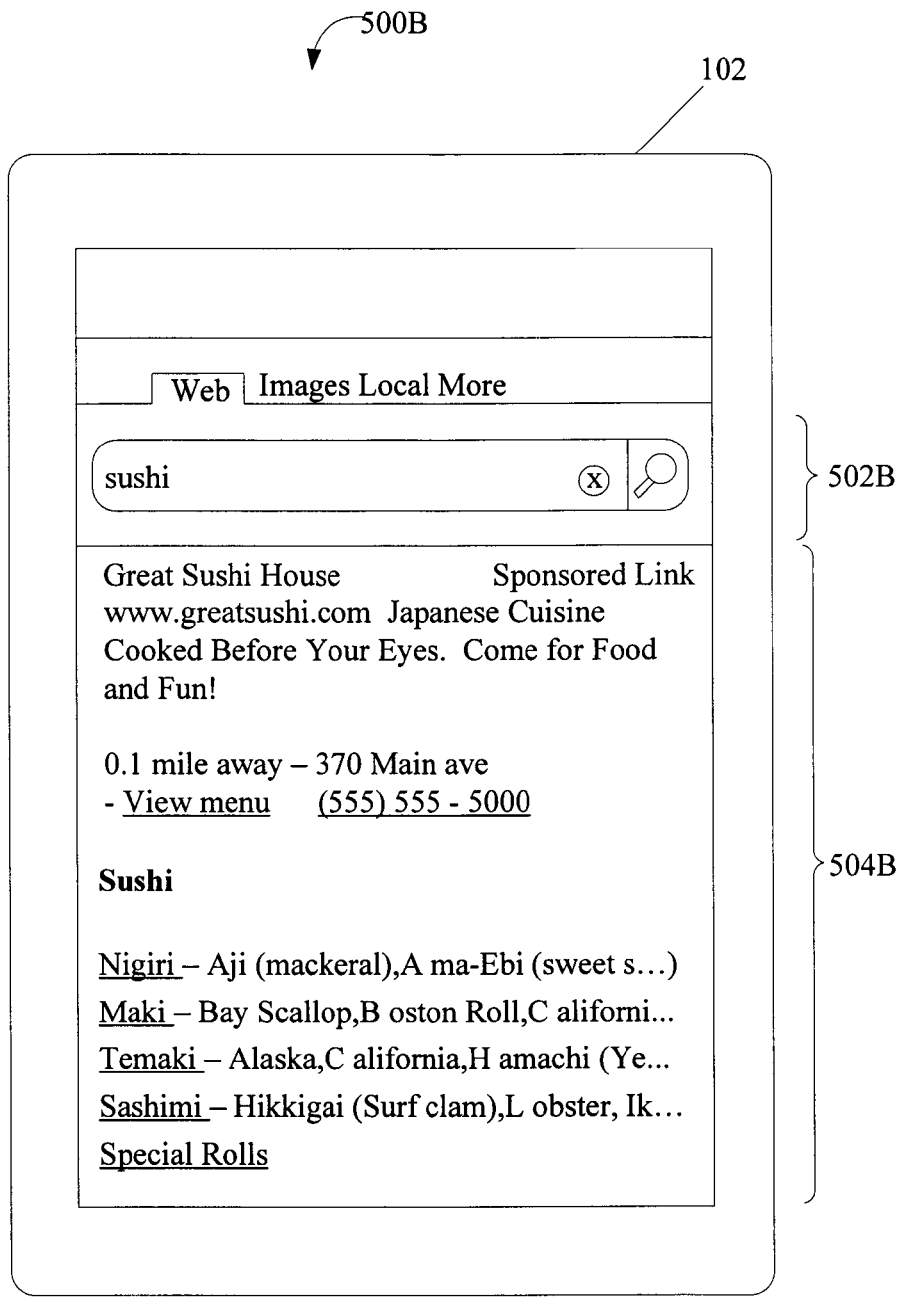

FIG. 5A is a diagram 500A illustrating a location-based promotional message 504A with expandable content displayed at mobile communication device 102, according to various implementations of the invention. Diagram 500A is similar to diagram 400 illustrated in FIG. 4 except that promotional message 504A may include a plus-box (illustrated in FIG. 5A as a plus sign with "View menu" link) that when selected expands to show, for example, a restaurant menu. In some implementations of the invention, mobile communication device 102 may display a search application. The search application may provide a search input area 502A where one or more search keywords (illustrated in FIG. 5A as "sushi") may be entered. Along with search results 506A, the search application may display promotional message 504A. In some implementations of the invention, promotional message 504A may indicate a distance similar to the distance illustrated in FIG. 4.

Figure 6:
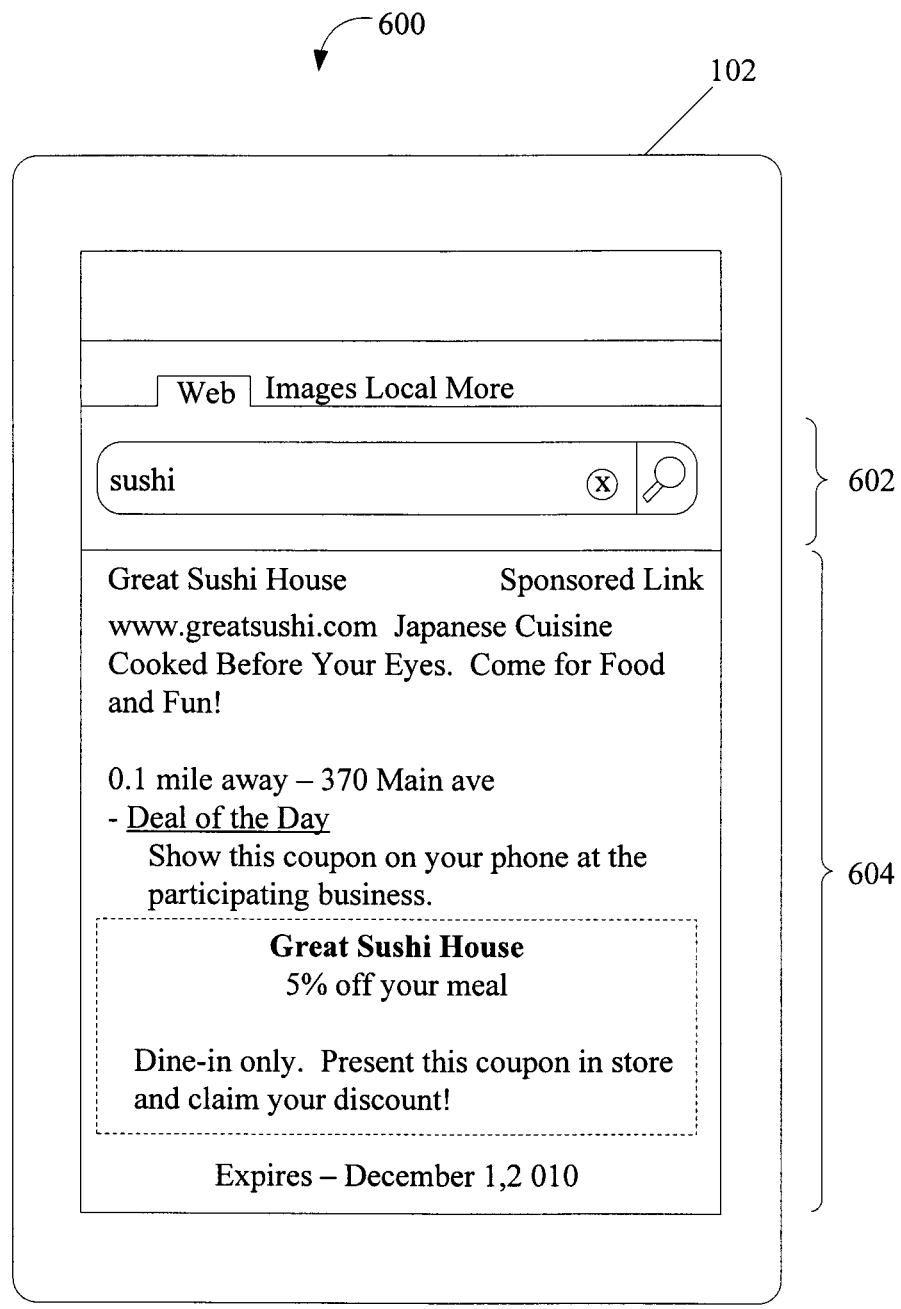
FIG. 6 is a diagram illustrating a location-based promotional message with expandable content displaying a coupon at a mobile communication device, according to various implementations of the invention.

In some implementations of the invention, promotional message 504A may be expandable. For instance, promotional message 504A includes a restaurant menu and/or menu items. As previously noted, the restaurant menu may be included in promotional message 504A based on the distance. In other words, in some implementations of the invention, the entity (illustrated in FIG. 5A as "Great Sushi House") may specify different promotional messages to be communicated to mobile communication device 102 based on the distance to one of its physical locations (illustrated in FIG. 5A as "370 Main ave"). At a different distance, for example, instead of promotional message 504A that includes the restaurant menu, the entity may have specified communication of a promotional message that includes a coupon (as illustrated in FIG. 6), for example, and/or other promotional content. Thus, the entity may specify different content for different distances.

In some implementations of the invention, promotional message 504A may include a call-to-action such as a telephone link that when selected by the user causes mobile communication device 102 to dial the number associated with the telephone link.

In some implementations of the invention, upon a user selection of the plus-box, promotional message 504A may expand to reveal additional content as illustrated in FIG. 5B.

FIG. 6 is a diagram 600 illustrating a location-based promotional message with expandable content displaying a coupon at mobile communication device 102, according to various implementations of the invention. Diagram 600 is similar to diagram 500A illustrated in FIG. 5A except that promotional message may include a coupon to the retailer when the plus-box (illustrated in FIG. 6 as a plus sign with "Deal of the Day" link) is expanded. In some implementations of the invention, mobile communication device 102 may display a search application. The search application may provide a search input area 602 where one or more search keywords (illustrated in FIG. 5A as "sushi") may be entered.

Figure 7:
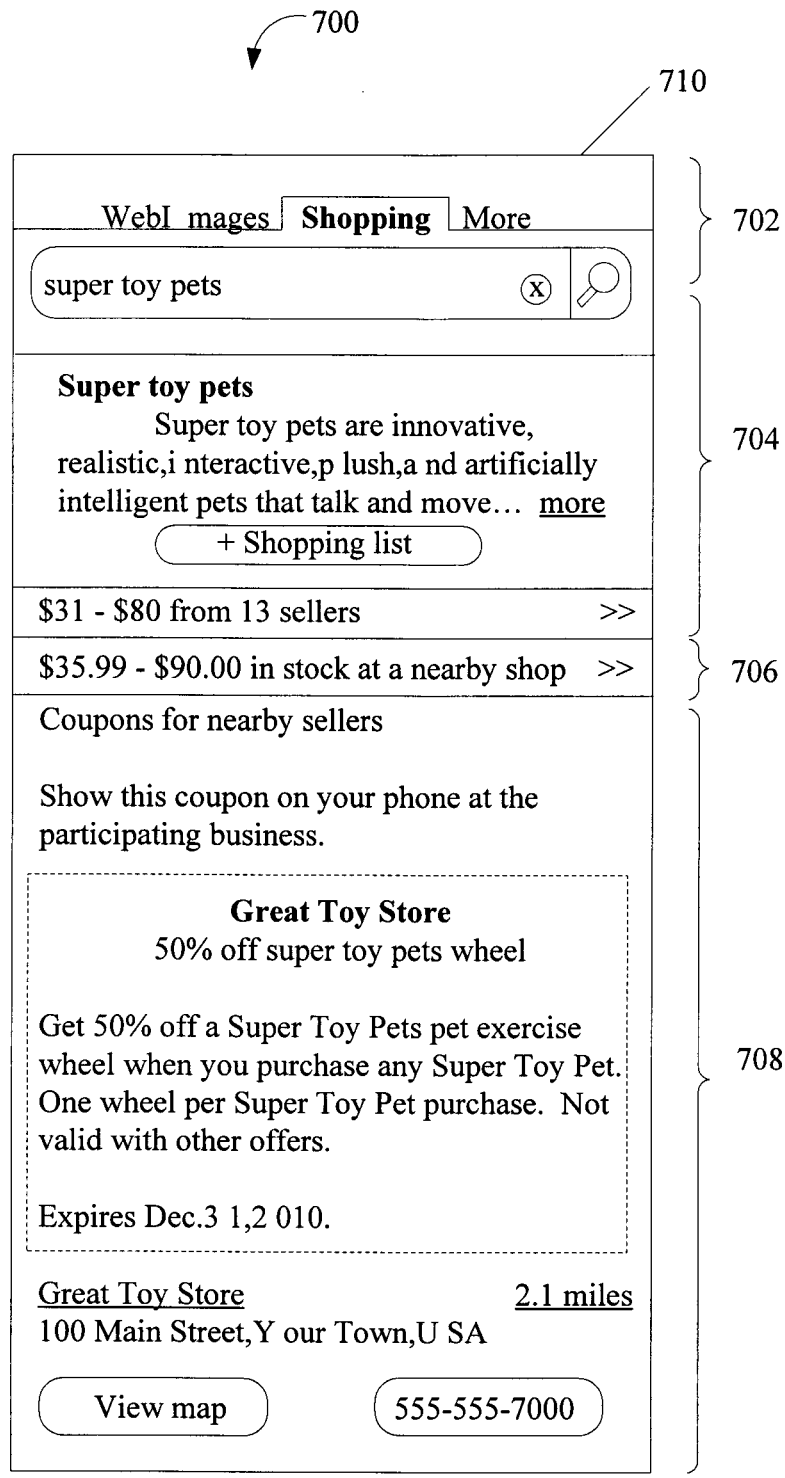
FIG. 7 is a diagram illustrating examples of screen shots of a promotional message displayed along with a shopping application, according to various implementations of the invention.

FIG. 7 is a diagram 700 illustrating an example of a screen shot 710 of a promotional message displayed along with a shopping application, according to various implementations of the invention. In some implementations of the invention, the shopping application may include a search input area 702 where one or more search keywords (illustrated in FIG. 7 as "super toy pets") may be entered. Along with shopping results 704, entities selling goods and/or services matching the one or more search keywords and having physical locations nearby may be indicated in results area 706. When selected by the user, results area 706 may cause a device executing the shopping application to display a list of the nearby entities, promotional messages associated with the nearby entities, or other information related to the nearby entities. In some implementations of the invention, the shopping application may display promotional message 708, illustrated in FIG. 7 as a coupon for products that match the one or more search keywords. As previously noted, promotional message serving system 110 may have identified promotional message 708 based on the distance from a physical location of the entity associated with promotional message 708 and potential interests of the user.

Figure 8:
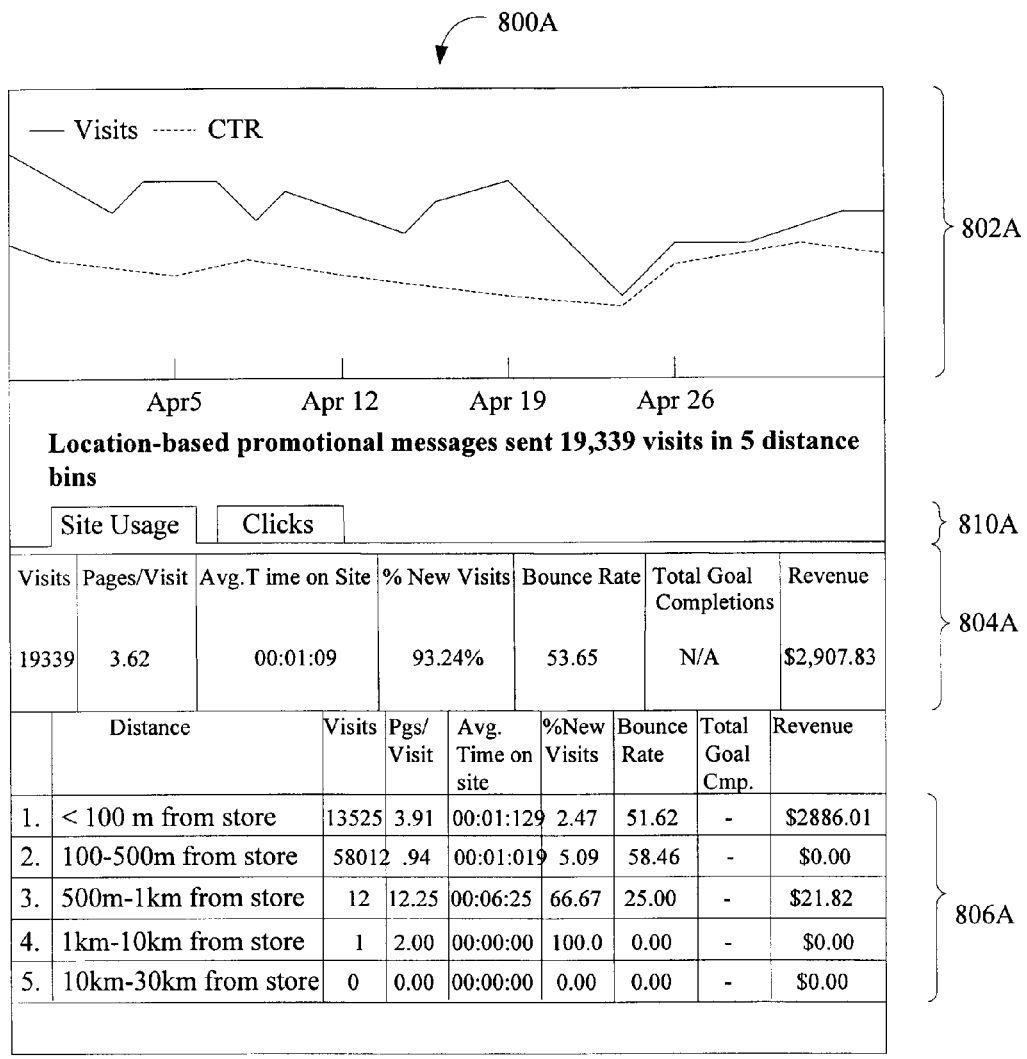
FIGS. 8A and 8B are diagrams illustrating a screenshot of a report that includes one or more metrics indicating effects of distance on success of promotional messages, according to various implementations of the invention.
Figure 8:
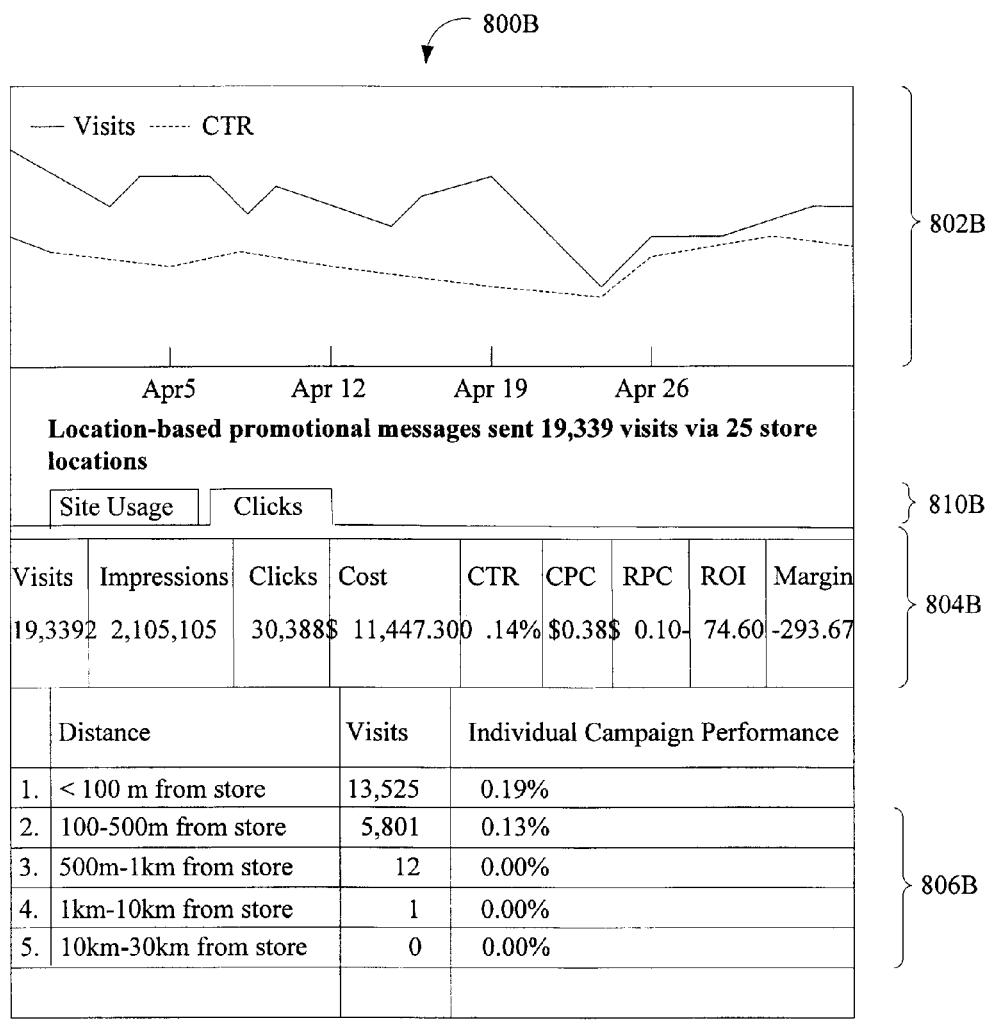

FIGS. 8A and 8B are diagrams illustrating a screenshot of a report 800 that includes one or more metrics indicating effects of distance on success of promotional messages, according to various implementations of the invention. Report 800 (illustrated in FIGS. 8A and 8B as reports 800A and 800B) may be generated by metrics analysis system 120 described herein. In some implementations of the invention, the report may include a graphical display area 802 (illustrated in FIGS. 8A and 8B as display areas 802A and 802B). The graphical display area 802 may include a line graph, a bar graph, or other graphical display that conveys performance of location-based promotional messages via virtual information such as web page visits, CTRs, and/or other virtual information.

In some implementations of the invention, report 800 may include virtual information area 804 (illustrated in FIGS. 8A and 8B as virtual information areas 804A and 804B) displays virtual information such as number of virtual accesses (i.e., visits), average duration of the virtual access (i.e., Avg. Time on Site), and/or other virtual information. In some implementations of the invention, the revenue associated with the virtual information may be displayed in virtual information area 804.

In some implementations of the invention, report 800 may include distance bin area 806 (illustrated in FIGS. 8A and 8B as distance bin areas 806A and 806B). Distance bin area 806 may display different distance bins that each include virtual information as a function of distance. In other words, the distance bins group virtual accesses based on the distance a mobile communication device is from a physical location of an entity when the device accessed a virtual location of the entity. In this manner, the effect of distance on the effectiveness of promotional messages may be analyzed using report 800.

In some implementations of the invention, report 800 may include tabs 810 (illustrated in FIGS. 8A and 8B as tabs 810A and 810B). Selection of tabs 810 may cause report 800 to display another report based on the particular tab 800 that was selected. For instance, the "Site Usage" tab may cause report 800A to be displayed. Report 800A may display virtual information based on virtual accesses, such as visits, to be displayed. The "Clicks" tab may cause report 800B to be displayed. Report 800B may display virtual information based on selections or clicks. As would be appreciated, other tabs 810 (not otherwise illustrated in FIGS. 8A and 8B) may be displayed and selectable. For example, selection of a tab 810 may cause a report based on physical-locations of an entity to be displayed. Metrics displayed in report 800A and/or report 800B may be included in the physical-locations-based report so that an entity such as a retailer may view metrics according to distance bins for each physical location (such as a store) of the retailer.

Implementations of the invention may be made in hardware, firmware, software, or any suitable combination thereof. Implementations of the invention may also be implemented as instructions stored on a machine readable medium, which may be read and executed by one or more processors. A tangible machine-readable medium may include any tangible, non-transitory, mechanism for storing or transmitting information in a form readable by a machine (e.g., a computing device). For example, a tangible machine-readable storage medium may include read only memory, random access memory, magnetic disk storage media, optical storage media, flash memory devices, and other tangible storage media. Intangible machine-readable transmission media may include intangible forms of propagated signals, such as carrier waves, infrared signals, digital signals, and other intangible transmission media. Further, firmware, software, routines, or instructions may be described in the above disclosure in terms of specific exemplary implementations of the invention, and performing certain actions. However, it will be apparent that such descriptions are merely for convenience and that such actions in fact result from computing devices, processors, controllers, or other devices executing the firmware, software, routines, or instructions.

Implementations of the invention may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A computer-implemented method, comprising:
receiving a request associated with a mobile communication device;
in response to the request, determining a location of the mobile communication device and at least one potential interest of a user of the mobile communication device;
identifying a plurality of different distances between the location of the device and geographically diverse physical locations of entities each having an available promotional message;
determining a plurality of prediction values each having an associated magnitude that indicates a probability that a corresponding promotional message from among the available promotional messages will be selected by the user of the mobile communication device, each prediction value based on the location of the mobile communication device, the respective distance between the location of the mobile communication device and the physical location of the associated entity, and the at least one potential interest;
identifying a promotional message from among the available promotional messages based on the plurality of prediction values; and
communicating the identified promotional message to be displayed on the mobile communication device.

2. The computer-implemented method of claim 1, wherein the interest-based information comprises at least one of: one or more search terms previously entered by the user, a promotional message previously selected by the user, or a web page previously visited by the user.

3. The computer-implemented method of claim 1, wherein the user selects the promotional message by physically clicking the promotional message on the device, physically shaking the device or issuing a voice command to the device responsive to the promotional message indicative of the user's selection of the promotional message.

4. The computer-implemented method of claim 1, wherein an indication of the distance between the device and the physical location associated with the promotional message displayed on the device is included with the displayed promotional message.

5. The computer-implemented method of claim 1, wherein the promotional message is associated with a bid value, and wherein identifying the promotional message further comprises determining an expected revenue return value based on the bid value and the prediction value corresponding to the promotional message, wherein the promotional message is identified from the plurality of promotional messages based on the identified promotional message having the greatest expected revenue return value.

6. The computer-implemented method of claim 5, wherein the bid value is changed as a function of the distance.

7. The computer-implemented method of claim 1, wherein content of the promotional message displayed on the device is changed as a function of the distance.

8. The computer-implemented method of claim 7, wherein the content includes at least one of: walking directions to the physical location, an input to make reservations, an input to search product availability, one or more images associated with the physical location, one or more promotional offers, a restaurant menu, a business update, a phone number call-to-action, an ad check-in, or one or more upcoming events.

9. The computer-implemented method of claim 1, wherein generating the plurality of prediction values further comprises determining a first weight factor for the distance and a different, second weight factor for the interest-based information, wherein each of the plurality of prediction values is determined responsive to the first and second weight factors.

10. The computer-implemented method of claim 1, further comprising:
receiving an indication that the promotional message was selected at the mobile communication device; and
generating a plurality of subsequent prediction values based on the indication.

11. The computer implemented method of claim 1, wherein the identified promotional message communicated for display on the mobile communication device has a corresponding prediction value from among the plurality of prediction values that indicates the identified promotional message has the greatest probability of selection by the user.

12. A computer-implemented method, comprising:
receiving distance information that indicates a first distance between a mobile communication device and a physical location of an entity;
receiving virtual information that indicates a virtual access by the mobile communication device to a virtual location of the entity;

generating an association between the first distance and the virtual access;

determining, based on the association, a second distance between the physical location and the mobile communication device when the mobile communication device accessed the virtual location; and generating a report that includes at least a portion of the distance information and at least a portion of the virtual information based on the first and second distances.

13. The computer-implemented method of claim 12, wherein the distance information includes a plurality of distances each corresponding to different distances between different mobile communication devices and the physical location.

14. The computer implemented method of claim 12, wherein the virtual access by the mobile communication device to a virtual location of the entity comprises visiting a web page of the entity via the mobile communication device.

15. The computer-implemented method of claim 13, wherein the report includes revenue information and the revenue information includes a revenue value associated with one or more of the plurality of distances, the computer-implemented method further comprising displaying, via the report, the revenue value with the associated one or more of the plurality of distances.

16. The computer-implemented method of claim 14, wherein the virtual information includes at least one of: a number of virtual accesses to the virtual location, a click-thru-rate, a number of pages visited during the virtual access, a bounce rate, a percent of new visits, or an average duration of the virtual access.

17. A system, comprising:
a promotional message serving system comprising one or more processors configured to:
receive a request associated with a mobile communication device;
in response to the request, determine a location of the mobile communication device and at least one potential interest of a user of the mobile communication device;
identify a plurality of different distances between the location of the mobile communication device and geographically diverse physical locations of a population of entities, wherein each entity in the population of entities has an associated promotional message;
determine a plurality of prediction values each having an associated magnitude that indicates a probability that a corresponding promotional message from among the associated promotional messages will be selected by the user of the mobile communication device, each prediction value based on the location of the mobile communication device, the distance between the location and the physical location of the entity associated with the promotional message, and the at least one potential interest;
select a promotional message from among the plurality of promotional messages based on the respective magnitudes of the plurality of prediction values; and
communicate the promotional message to be displayed on the mobile communication device.

18. The system of claim 17, wherein the interest-based information comprises at least one of: one or more search terms previously entered by the user, a promotional message previously selected by the user, or a web page previously visited by the user.

19. The system of claim 17, wherein the user selects the promotional message by physically clicking the promotional message on the device, physically shaking the device or issuing a voice command to the device responsive to the promotional message indicative of the user's selection of the promotional message.

20. The system of claim 17, wherein an indication of the distance associated with the identified promotional message is included with the promotional message.

21. The system of claim 19, wherein the promotional message is associated with a bid value, and wherein the promotional message serving system further determines an expected revenue return value based on the bid value and the prediction corresponding to the promotional message, and the promotional message is identified based on the expected revenue return value.

22. The system of claim 21, wherein the bid value is changed as a function of the distance.

23. The system of claim 19, wherein content of the promotional message is changed as a function of the distance.

24. The system of claim 23, wherein the content includes at least one of: walking directions to the physical location, an input to make reservations, an input to search product availability, one or more images associated with the physical location, one or more promotional offers, a restaurant menu, a business update, a phone number call-to-action, an ad check-in, or one or more upcoming events.

25. The system of claim 17, wherein the promotional message serving system further determines determine a plurality of predictions further comprises determining a weight factor for at least one of the distance or the interest-based information, and each of the plurality of predictions is determined responsive to the determined weight factor.

26. The system of claim 17, the one or more processor further configured to:
receive an indication that the promotional message was selected at the mobile communication device; and
generate a plurality of subsequent predictions based on the indication.

27. The system of claim 17, wherein the identified promotional message communicated to the mobile communication device has the greatest probability of selection by the user based on the magnitude of the corresponding prediction value being greater than the magnitudes of the prediction values for the remaining plurality of prediction values.

28. A system comprising:
a metrics analysis server comprising one or more processors configured to:
receive distance information that indicates a first distance between a mobile communication device and a physical location of an entity;
receive virtual information that indicates a virtual access by the mobile communication device to a virtual location of the entity;
generate an association between the first distance and the virtual access;
determine, based on the association, a second distance between the physical location and the mobile communication device when the mobile communication device accessed the virtual location; and
generate a report that includes at least a portion of the distance information and at least a portion of the virtual information based on the first and second distances.

29. The system of claim 28, wherein the distance information includes a plurality of distances each corresponding to different distances between different mobile communication devices and the physical location.

30. The system of claim 28, wherein the virtual access by the mobile communication device to a virtual location of the entity comprises visiting a web page of the entity via the mobile communication device.

31. The system of claim 29, wherein the report includes revenue information, the revenue information includes a revenue value associated with one or more of the plurality of distances, and the one or more processors are further configured to display, via the report, the revenue value with the associated one or more of the plurality of distances.

32. The system of claim 30, wherein the virtual information includes at least one of: a number of virtual accesses to the virtual location, a click-thru-rate, a number of pages visited during the virtual access, a bounce rate, a percent of new visits, or an average duration of the virtual access.

* * * * *